Patented Jan. 25, 1938

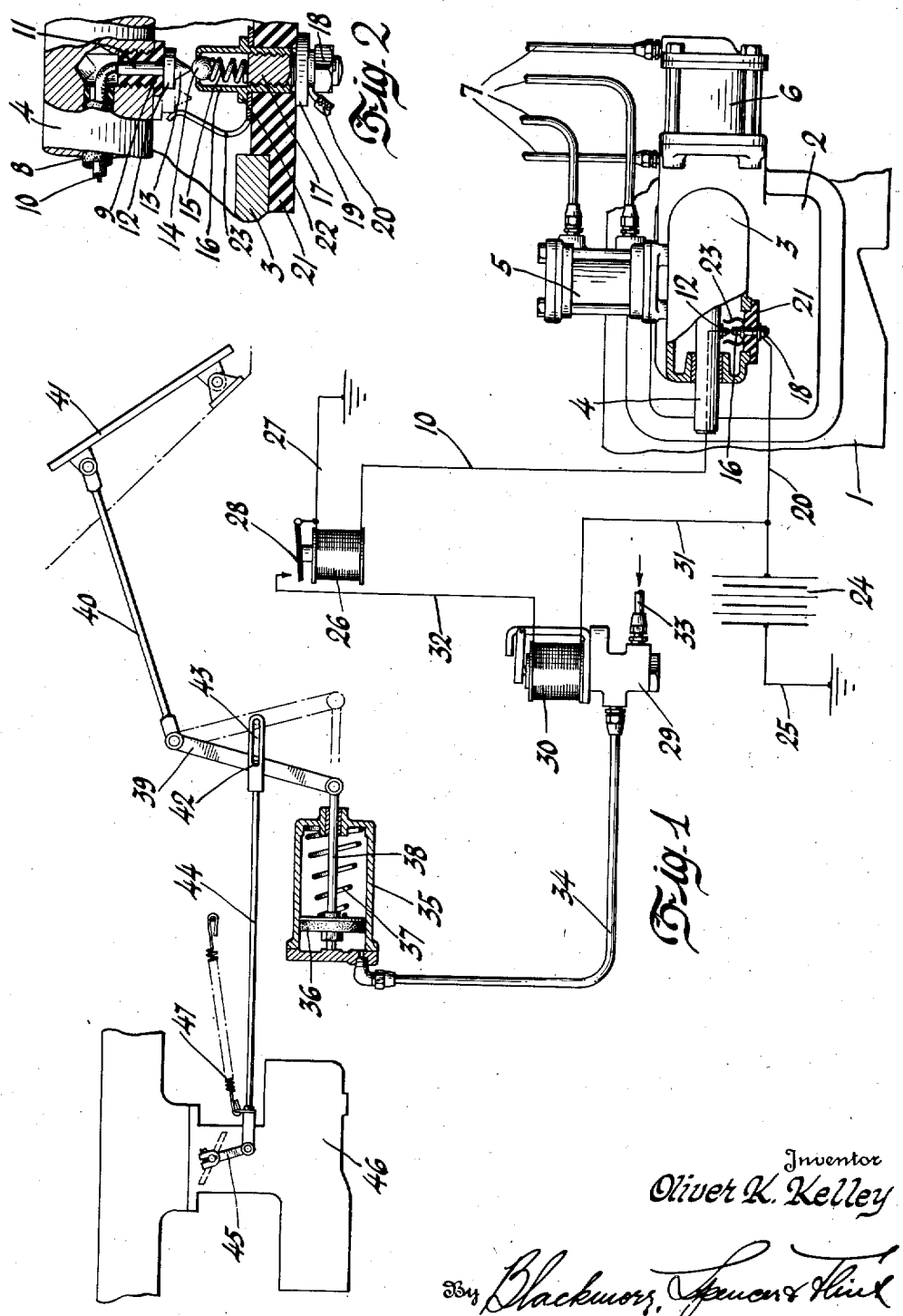

2,106,607

UNITED STATES PATENT OFFICE 2,106,607

THROTTLE AND TRANSMISSION INTERLOCK

Oliver K. Kelley, Pontiac, Mich., assignor, by mesne assignments, to Yellow Truck and Coach Manufacturing Company, Pontiac, Mich., a corporation of Maine Application August 22, 1935, Serial No. 37,325

5 Claims. (Cl. 74—472)

This invention relates to the control mechanism of a motor vehicle, and particularly to an interlock between the gear shift mechanism and the engine fuel feed system whereby racing or speeding of the engine is prevented during gear shifting operation.

In the operation of a motor vehicle having a clutch and change speed gearing, the shifting of gears should be done with the clutch disengaged and the engine running slowly, and in the event the clutch is engaged too soon and simultaneously therewith the engine is speeded up, damage to the power transmission assembly is likely to result. The possibility of improper operation is increased when compressed air is employed for effecting gear settings due to the lag which occurs between the admission of air and the response to pressure. To compensate for such lag, which, incidentally, is most pronounced when the power plant is at the rear of the vehicle or otherwise removed from the operator's forward position as is the case with certain large passenger coaches now in use, the operator must allow a sufficient time interval between his sequential manipulation of the manual control means. To guard against improper operation is the primary object of this invention.

In its broad aspect, the invention consists of mechanism whereby engine acceleration is prevented during the shifting operation. This results in an idle engine speed until the gears are fully set and eliminates the imposition of damaging strain by the sudden application of severe stress upon partially engaged parts.

For a better understanding of the invention reference should be had to the accompanying drawing wherein Figure 1 is a more or less diagrammatic layout illustrating a preferred embodiment of a throttle and transmission interlock, and Figure 2 is a detailed sectional view of a circuit closing switch associated with the change speed device.

The gear shift mechanism and the change speed gearing may be of a conventional type and the drawing illustrates only so much thereof as is necessary for an understanding of its operation. The change speed gearing through which power is transmitted between the engine and the road wheels is enclosed within the gear box or housing 1, one side of which carries a cover plate 2 having a hollow housing 3 thereon. Within the hollow housing 3 is supported a rockable and shiftable shaft 4 by which the shift rails of the change speed gearing are individually selected and shifted. For this purpose the shaft 4 carries a depending arm (not shown) which upon rocking movement of the shaft 4 is brought into proper engagement with a selected rail and upon axial movement of the shaft shifts the rail to set selected gears in drive relation for power transmission.

For the operation of the shaft 4, use is made of a conventional compressed air sytem which includes a piston cylinder 5 containing a piston connected with the shaft for rocking the same, and a piston cylinder 6 containing a piston secured on one end of the shaft 4 for the shifting operation. A series of air pressure lines or conduits 7 are shown connected to opposite ends of the respective piston cylinders for conducting air under pressure thereto, and these several conduits run from the operator's station at the front of the vehicle for connection through suitable valving with the source of compressed air. The valving usually consists of a multiple valve, the manipulation of which introduces air into the conduits in certain predetermined combinations whereby the desired speed setting is effected as will be readily understood by those familiar with the art.

At the end of the shaft 4 opposite to the piston cylinder 6 there are located a pair of drilled openings extending at right angles to each other, the axial opening extending from the end of the rail to an intermediate point and having mounted therein an insulator sleeve 8 and the lateral opening having therein an insulator plug 9. An electrical cable or conductor 10 extends through the sleeve 8 for connection to a contact pin 11 in the plug 9, which pin terminates in the head 12 and a pointed contact tip 13. As shown in Figure 2, the point of the tip 13 is intended for engagement with a ball 14 held in engagement therewith by a coil spring 15 enclosed within the sleeve 16, the inner end of which is spun over or interiorly flanged to provide a seat for the ball when the contact element is out of engagement therewith. The opposite end of the spring bears against a stud 17 threaded into the sleeve and carrying a nut 18 and a washer 19 by which a conductor cable 20 is fastened to the stud and which also serves to mount the sleeve on an insulator cover plate 21 removably secured over an opening in the wall of the housing 3. An annular collar 22 on the sleeve provides an abutment for the inner side of the closure 21 and also serves to secure in place a forked contact member 23 which provides a pair of inwardly extending spring prongs adapted for engagement with the contact head 12 as is indicated by the dotted lines in Figure 2. By this construction the cables 10 and 20 may be bridged for the flow of current therethrough either by the engagement of the contact point 13 with the ball 14 or the contact head 12 with either of the two contact fingers 23. Point contact between the parts 13 and 14 is effected whenever the shifter parts are in neutral position, while the head 12 engages one or the other of the contact fingers 23 as the shaft 4 is shifted axially to positions whereby selected gears are in proper drive relationships. In other words, the spacing of the fingers from the neutral position of the shaft 4 corresponds to the extent of movement of the shaft in completing a shift and the fingers are sufficiently wide as to be engaged by the contact head 12 in all positions to which the shaft 4 may be rocked in the selection of a shift rail.

The cable 20, as shown in Figure 1, is connected to one side of a storage battery 24 or other suitable source of electric current, the other side of which is grounded as at 25, while the cable 10 is joined to a relay device 26 which in turn is grounded at 27. This circuit is energized whenever the wires 10 and 20 are bridged as before described, and energization of the relay 26 serves to open the switch blade 28 which is also grounded through the connection 27.

This switch blade 28 controls a circuit arranged in parallel to that before described, and contains an electrically operated valve 29 including a solenoid 30 connected with the battery by the conductor 31 and by the conductor 32 with the contact device for the switch blade 28.

Energization of the solenoid 30 serves to open the valve 29 and allows air or other suitable fluid under pressure to flow from the source of supply through the conduit 33 and the conduit 34 to a fluid pressure device including the cylinder 35 and a piston 36 within the cylinder. A coil spring 37 serves to return the piston to normal position after fluid pressure is relieved and the limit of the return movement is established by the engagement of the end of the piston rod 38 with the end wall of the cylinder 35. The opposite end of the rod 38 extends through the cylinder and is pivotally connected with a floating lever 39, the opposite end of which is joined by a link 40 with a foot accelerator pedal 41. Intermediate its ends the lever 39 is provided with a laterally extending pin 42 slidable within an elongated opening 43 in the end of a link 44 adapted for connection with the throttle operating arm 45 of the carburetor 46. A coil spring 47 or the like may be provided to return the throttle to closed position when foot pressure on the pedal 41 is relieved.

When the parts referred to are in the full line position illustrated in the drawing it will be apparent that depression of the pedal 41 will swing the lever 39 about its pivotal connection with the piston rod 38, and the pin 42 engaging the end of the slot 43 will transmit the movement through the rod 44 to the throttle arm 45 to open the throttle against the resistance of the spring 47. When, however, the lever 39 is in the broken line position due to the application of air under pressure to the piston 36 depression of the foot pedal 41 will simply move the pin 42 in the elongated slot. Because of this lost motion connection the engine throttle remains in closed position and the possibility of racing the engine is therefore eliminated.

From the above description it will be seen that there has been provided an interlock whereby regardless of the inexperience or carelessness of an operator, the engine cannot be speeded up during the gear shifting operation. After the gears are fully set the vehicle may be operated in the usual fashion. In any speed setting the contact head 12 engages with one or the other of the contact fingers depending upon the direction in which the shaft 4 is shifted to bring the gears in driving relation, and the contact 13 engages the ball 15 only in the neutral position of the parts. This last mentioned circuit closing expedient is provided inasmuch as it is sometimes desirable to open the throttle while the vehicle is not in motion.

While the above description has been more or less specific, the invention is not limited to the exact details referred to and it is to be understood that such modifications may be made as come within the appended claims.

I claim:

1. The combination with engine throttle actuating linkage having a lost motion connection and selective speed gear setting mechanism, of a fluid pressure actuated device controlling the action of said lost motion connection, an electrically actuated valve controlling fluid pressure supply to said device, and means associated with the selective speed gear setting mechanism controlling the flow of electric current in the circuit containing said electrically actuated valve in accordance with predetermined settings of said mechanism.

2. The combination with variable speed gear setting mechanism and the fuel feed system of an engine, of an electrically actuated device adapted to limit operation of the fuel feed system, and circuit closing means associated with the gear setting mechanism to direct current to said device when the mechanism is positioned in predetermined settings.

3. In a motor vehicle having an engine driven change speed transmission gearing, means to prevent acceleration of an engine during operations of changing transmission gear settings, including an engine fuel feed system, manually operated means controlling said system, a pressure responsive device to free the system from manual control, operating connections between said device and the manually operated means, means to supply operating pressure to said device, an electrically operated valve controlling the application of pressure to said device, a change speed shifter movable between stations and switch means dependent upon shifter position to supply electric current for operating said valve.

4. In a motor vehicle, means to prevent acceleration of an engine during operations of changing transmission gear settings, including a manually controlled engine fuel feed system, a change speed shifter movable between a gear setting station and a neutral station, means operably connected with said system to free the same from manual control, and means under control of the speed shifter to operate the first-named means, said second named means being constructed and arranged to be brought into action during travel of the shifter between said stations and to be cut out of action by the setting of the shifter in either the neutral station or the gear setting station.

5. In a motor vehicle, means to prevent engine acceleration while making changes of gear settings, including a manually controlled engine fuel feed system, a change speed shifter movable between a neutral station and a gear setting station, means operably connected with said system to free the same from manual control, and means under control of the shifter and active only during travel of the shifter between said stations to operate said first mentioned means, the said mentioned means being inactive when the shifter is in either of said stations.

OLIVER K. KELLEY.

CERTIFICATE OF CORRECTION.

Patent No. 2,106,607.  January 25, 1938.

OLIVER K. KELLEY.

It is hereby certified that error appears in the printed specification of the above numbered patent requiring correction as follows: Page 2, second column, line 50, claim 3, after "means" insert the word normally; page 3, second column, line 3, claim 5, after "said" second occurrence, insert the word second; and that the said Letters Patent should be read with these corrections therein that the same may conform to the record of the case in the Patent Office.

Signed and sealed this 29th day of March, A. D. 1938.

(Seal)

Henry Van Arsdale,
Acting Commissioner of Patents.

5. In a motor vehicle, means to prevent engine acceleration while making changes of gear settings, including a manually controlled engine fuel feed system, a change speed shifter movable between a neutral station and a gear setting station, means operably connected with said system to free the same from manual control, and means under control of the shifter and active only during travel of the shifter between said stations to operate said first mentioned means, the said mentioned means being inactive when the shifter is in either of said stations.

OLIVER K. KELLEY.

CERTIFICATE OF CORRECTION.

Patent No. 2,106,607.   January 25, 1938.

OLIVER K. KELLEY.

It is hereby certified that error appears in the printed specification of the above numbered patent requiring correction as follows: Page 2, second column, line 50, claim 3, after "means" insert the word normally; page 3, second column, line 3, claim 5, after "said" second occurrence, insert the word second; and that the said Letters Patent should be read with these corrections therein that the same may conform to the record of the case in the Patent Office.

Signed and sealed this 29th day of March, A. D. 1938.

(Seal)

Henry Van Arsdale,
Acting Commissioner of Patents.

CERTIFICATE OF CORRECTION.

Patent No. 2,106,607.                                         January 25, 1938.

OLIVER K. KELLEY.

It is hereby certified that error appears in the printed specification of the above numbered patent requiring correction as follows: Page 2, second column, line 50, claim 3, after "means" insert the word normally; page 3, second column, line 3, claim 5, after "said" second occurrence, insert the word second; and that the said Letters Patent should be read with these corrections therein that the same may conform to the record of the case in the Patent Office.

Signed and sealed this 29th day of March, A. D. 1938.

(Seal)
Henry Van Arsdale,
Acting Commissioner of Patents.